(12) United States Patent
Terashima et al.

(10) Patent No.: US 9,656,694 B2
(45) Date of Patent: May 23, 2017

(54) IMPACT ENERGY ABSORBING VEHICLE CHARGING PORT SUPPORT ARRANGEMENT

(75) Inventors: Yasutsune Terashima, Ebina (JP); Takeshi Kakiuchi, Fujisawa (JP); Masahiro Ataka, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 1147 days.

(21) Appl. No.: 13/319,931

(22) PCT Filed: Jun. 28, 2010

(86) PCT No.: PCT/IB2010/001561
§ 371 (c)(1),
(2), (4) Date: Nov. 10, 2011

(87) PCT Pub. No.: WO2011/007223
PCT Pub. Date: Jan. 20, 2011

(65) Prior Publication Data
US 2012/0049799 A1    Mar. 1, 2012

(30) Foreign Application Priority Data
Jul. 17, 2009    (JP) .................................. 2009-168487

(51) Int. Cl.
*H02J 7/00*    (2006.01)
*B62D 21/15*    (2006.01)
(Continued)

(52) U.S. Cl.
CPC .............. *B62D 21/152* (2013.01); *B60K 1/04* (2013.01); *B60L 11/1816* (2013.01);
(Continued)

(58) Field of Classification Search
CPC ... Y02T 90/14; Y02T 10/7005; Y02T 90/128; Y02T 10/7088; Y02T 90/163
(Continued)

(56) References Cited

U.S. PATENT DOCUMENTS 5,498,948 A * 3/1996 Bruni et al. .................. 320/108
5,523,666 A * 6/1996 Hoelzl et al. ................ 320/109
(Continued)

FOREIGN PATENT DOCUMENTS

CN    101388560 A    3/2009
EP    0680057 A2    11/1995
(Continued)

OTHER PUBLICATIONS

An English translation of the Russian Decision on Grant of corresponding Russian Application No. 2012105461, issued on Jan. 28, 2013.
(Continued)

*Primary Examiner* — Arun Williams
(74) *Attorney, Agent, or Firm* — Global IP Counselors, LLP

(57) ABSTRACT

A vehicle charging port arrangement is provided with a vehicle body, a charging port support member and an electric charging port. The vehicle body includes a vehicle front end portion. The charging port support member is supported on the vehicle front end portion. The charging port support member includes an energy absorbing structure that is configured and arranged to deform towards a support structure of the vehicle front end portion and into an energy absorbing area that is disposed forward of the support structure of the vehicle front end portion during a frontal impact. The electric charging port is attached to the charging port support member, with the electric charging port being configured to receive an electric charging connector.

22 Claims, 4 Drawing Sheets

(51) Int. Cl.
  *B60K 1/04*    (2006.01)
  *B60L 11/18*   (2006.01)
  *B62D 25/08*   (2006.01)

(52) U.S. Cl.
  CPC ......... *B62D 25/084* (2013.01); *Y02T 10/7005* (2013.01); *Y02T 10/7072* (2013.01); *Y02T 90/14* (2013.01)

(58) Field of Classification Search
  USPC ........................................................ 320/109
  See application file for complete search history.

(56) References Cited

U.S. PATENT DOCUMENTS

| | | | | |
|---|---|---|---|---|
| 5,696,367 | A | * | 12/1997 | Keith ............................ 235/381 |
| 5,850,135 | A | * | 12/1998 | Kuki et al. .................... 320/108 |
| 2007/0046042 | A1 | * | 3/2007 | Campbell et al. ............. 293/102 |
| 2008/0111519 | A1 | * | 5/2008 | Vasilantone ................... 320/109 |
| 2009/0160204 | A1 | * | 6/2009 | Czopek et al. ............... 293/133 |

FOREIGN PATENT DOCUMENTS

| | | |
|---|---|---|
| JP | 07122328 A | 5/1995 |
| JP | 09-109691 | 4/1997 |
| JP | 10-152071 | 6/1998 |
| JP | 11-332003 | 11/1999 |
| JP | 11-332024 | 11/1999 |
| JP | 2000-085626 | 3/2000 |
| RU | 2192356 C2 | 11/2002 |
| WO | 2010143040 A1 | 12/2010 |

OTHER PUBLICATIONS

A Written Opinion of the International Search Authority for International Application No. PCT/IB2010/001561, dated Sep. 9, 2010, mailed Sep. 21, 2010.

An English translation of the Chinese Written Notification of Opinion upon First Examination for the corresponding Chinese Application No. 201080029316.3, issued on Nov. 18, 2013.

The extended European search report for the corresponding European Application No. 10799496.4-1752 / 2454121 issued on Nov. 26, 2014.

* cited by examiner

IMPACT ENERGY ABSORBING VEHICLE CHARGING PORT SUPPORT ARRANGEMENT

CROSS-REFERENCE TO RELATED APPLICATIONS

This application is a U.S. National stage of International Application No. PCT/IB2010/0001561, filed Jun. 28, 2010, which claims priority to Japanese Patent Application No. 2009-168487, filed on Jul. 17, 2009. The entire disclosure of Japanese Patent Application No. 2009-168487 is hereby incorporated herein by reference.

BACKGROUND

Field of the Invention

The present invention generally relates to a vehicle charging port arrangement for a vehicle that uses an electric motor as power source. More specifically, the present invention relates to a vehicle charging port that is located on a front end portion of the vehicle.

Background Information

Among such vehicles as hybrid vehicles and electric vehicles that use an electric motor as a drive power source, there are vehicles that uses an external electric power source to charge an onboard battery serving as a power source for the electric motor. Some of these vehicles have a charging port that is arranged on a vehicle front end portion of the vehicle body for receiving a charging plug or connector of the external electric power source. One example of a vehicle with such a charging port is disclosed in Japanese Laid-Open Patent Publication No. 2000-085626 (see, FIG. 4). The onboard battery is charged by inserting the charging plug into the charging port and drawing electric power from the external power source. In Japanese Laid-Open Patent Publication No. 2000-085626, the charging port is attached to a vehicle front end portion of a vehicle body by a box-like charging support. This box-like charging support is conventionally attached to an upper cross member of the vehicle body with brackets on both widthwise sides. Additionally, a rearward end of the box-like charging support is also attached to the vehicle body. More specifically, a support stay is arranged to span between the upper cross member and a lower cross member with the rearward end of the box-like charging support being attached to the support stay through a bracket.

SUMMARY

It has been discovered that with the conventional support structure described Japanese Laid-Open Patent Publication No. 2000-085626, problems can occur because the support rigidity is too high.

Now some design considerations for a charging port mounting structure (charging port structure) will be discussed. First, the charging port structure will typically have a minimum mounting (support) rigidity for reliably supporting the charging port during normal use. Second, when a person inserts and removes a charging plug or connector to and from the charging port, the person seldom inserts or removes the charger to or from the charging port in a straight fashion. Even a very skilled person will usually apply some degree of a misaligned insertion/removal force while inserting or removing the charging plug. The charging port support structure must be able to absorb such a misaligned insertion/removal force. Third, a vehicle front end portion of a vehicle body is generally provided with a crushable region that collapses during a frontal collision so as to absorb the impact energy and prevent the deformation of the vehicle body from reaching the passenger cabin. When a charging port structure is provided in the front crushable region of a vehicle body, the charging port structure is preferably configured to be crushable such that it can function to absorb impact energy.

With a conventional charging port structure such as described Japanese Laid-Open Patent Publication No. 2000-085626, the mounting (support) rigidity of the charging support is typically too high, as mentioned previously. Consequently, although the first design consideration can be satisfied, the second and third design considerations cannot be satisfied. When the second design consideration is not satisfied by the charging port structure, the misaligned insertion/removal forces applied to the charging plug are not absorbed by the support structure. Instead, the misaligned insertion/removal forces are conveyed directly to the charging port. Thus, the service life of the charging port is decreased. When the third design consideration are not be satisfied by the charging port structure, the charging port structure cannot be installed in the crushable region of the front portion of the vehicle body. Thus, the degree of freedom with respect to the placement of the charging port structure is limited. Meanwhile, if the third design consideration is ignored and the charging port structure is installed in the crushable region anyway, then the charging port structure will not be crushable in a frontal collision and the impact energy absorbing function of the crushable region will be degraded.

One object of the present disclosure is to provide a vehicle charging port structure that satisfies the aforementioned design considerations and resolves the problems explained above.

In view of the state of the known technology, one aspect of this disclosure is to provide a vehicle charging port arrangement that mainly comprises a vehicle body, a charging port support member, and an electric charging port. The vehicle body includes a vehicle front end portion. The charging port support member is supported on the vehicle front end portion. The charging port support member includes an energy absorbing structure that is configured and arranged to deform towards a support structure of the vehicle front end portion and into an energy absorbing area that is disposed forward of the support structure of the vehicle front end portion during a frontal impact. The electric charging port is attached to the charging port support member, with the electric charging port being configured to receive an electric charging connector.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
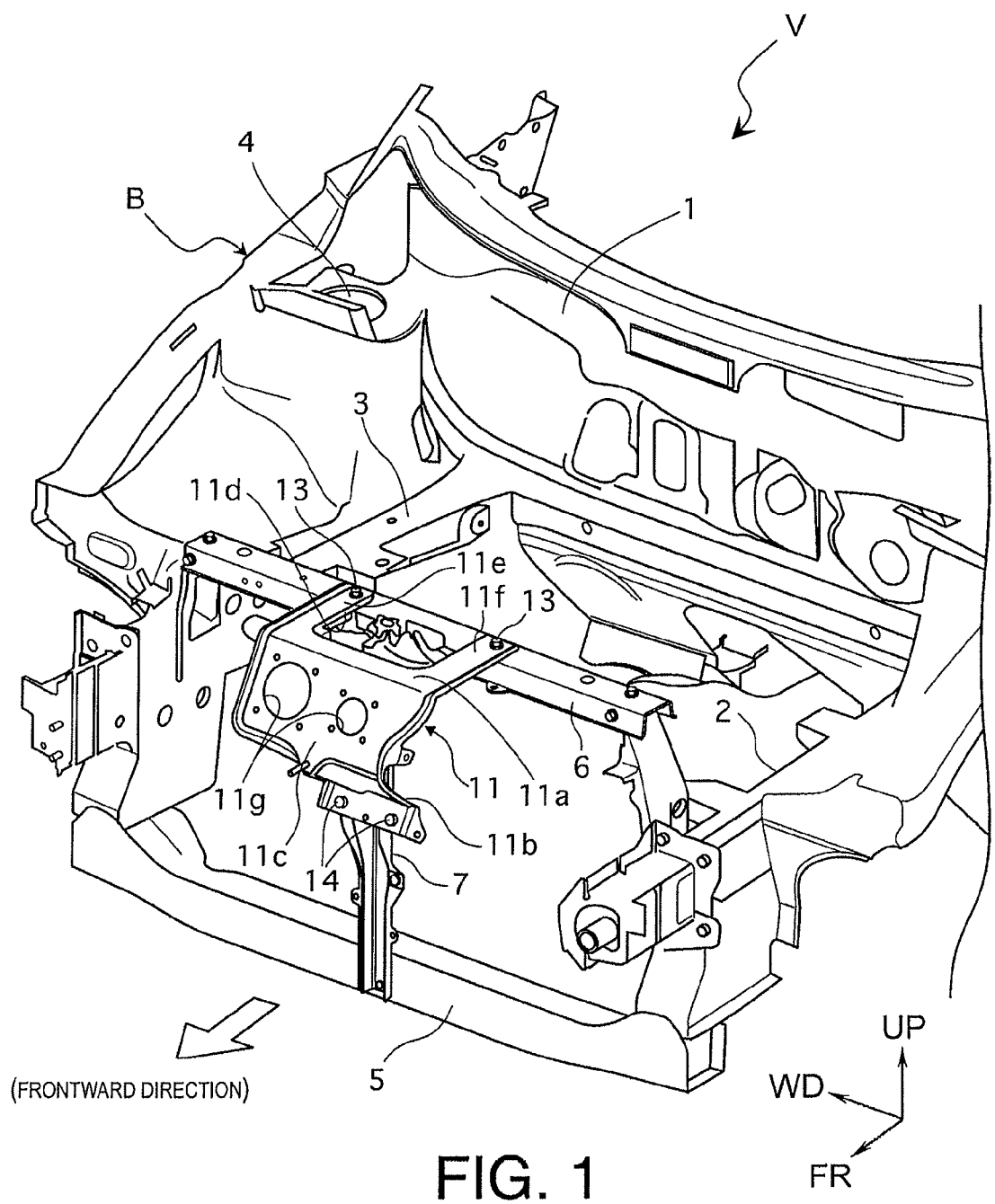
FIG. 1 is a simplified perspective view of a front portion of a vehicle body of a vehicle equipped with a charging port structure according to one illustrated embodiment.

Referring initially to FIG. 1, a vehicle V is illustrated having a vehicle charging port arrangement in accordance with one illustrated embodiment. In the figures, an arrow FR indicates a vehicle frontward direction of the vehicle V, an arrow UP indicates an upward direction of the vehicle V, and an arrow WD indicates a vehicle widthwise direction of the vehicle V. The vehicle charging port arrangement includes a part of a front end portion of the vehicle body B of the vehicle V. The vehicle front end portion 2 also includes various conventional components such as a hood, a pair of fenders, a front bumper, a front end module, a front fascia panel, etc.

Figure 2:
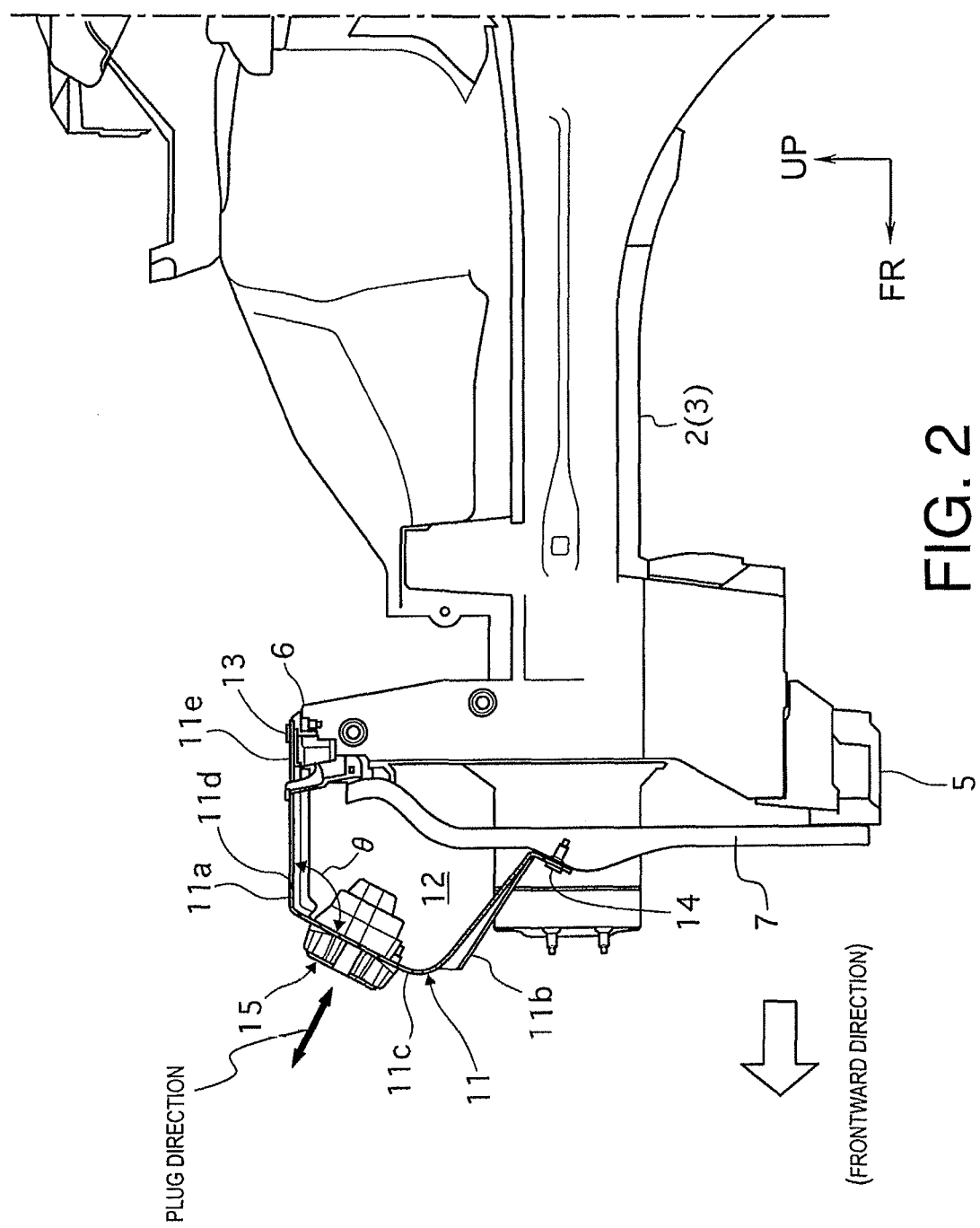
FIG. 2 is a simplified left side elevational view of the front portion of the vehicle body illustrated in FIG. 1 with the charging port attached.

As shown in FIGS. 1 and 2, the vehicle body B is a unitized body in which its body and its frame are integrated as one unit. Thus, the vehicle body B is not a body-on-frame arrangement. However, the vehicle charging port arrangement can be used with a body-on-frame arrangement as needed and/or desired. The frame of the vehicle body B includes a dash lower panel 1, a left front side member 2, a right front side member 3 and a pair of strut towers 4 (only one illustrated). As shown in FIG. 1, the frame of the vehicle body B further includes a lower cross member 5, an upper cross member 6 and a vertical retainer 7. The cross members 5 and 6 and the vertical retainer 7 constitute a support structure of the vehicle front end portion of the vehicle body B. The cross members 5 and 6 are laterally spaced deformable members extending in the longitudinal direction of the vehicle V. The cross members 5 and 6 are constructed so that an effective column length of each of the cross members 5 and 6 is reduced in the event of a frontal impact. The left and right front side members 2 and 3 are connected together at their forward ends by the lower cross member 5 from below and by the upper cross member 6 from above. The vertical retainer 7 is arranged to span between middle portions of the cross members 5 and 6. The cross members 5 and 6 and the vertical retainer 7 are rigid metal members that form structural frame members of the front end portion of the vehicle body B.

In this illustrated embodiment, in addition to the front end portion of the vehicle body B of the vehicle V, the vehicle charging port arrangement further includes a support plate 11 that serves as a charging port support member. The support plate 11 (the charging port support member) is supported on the vehicle front end portion of the vehicle body B to form an unobstructed space or open energy absorbing area 12 that is oriented in the vehicle widthwise direction WD. In this illustrated embodiment, the support plate 11 is provided near a front end of the vehicle body B that serves as a front collision crushable region. More specifically, for example, the support plate 11 is arranged frontward of the left and right front side members 2 and 3 in a central position between the left and right front side members 2 and 3. The left and right front side members 2 and 3 are energy-absorbing structures (front collision crushable structures) that form crushable zones in a conventional manner to absorb impact energy by plastically deforming in a longitudinal direction of the vehicle. Additionally, since the support plate 11 has the unobstructed space or open energy absorbing area 12, the charging port structure itself is crushable in a frontal collision and does not degrade the impact energy absorbing function of a crushable region. Thus, the charging port structure can be installed in the crushable region of a front portion of a vehicle body B. The degree of freedom with respect to the placement of the charging port structure is increased and the aforementioned third design consideration can be satisfied.

In this illustrated embodiment, the support plate 11 (the charging port support member) has a horizontal upper wall portion 11a, a lower end portion 11b and a charging port mounting wall portion 11c that spans between the horizontal upper wall portion 11a and the lower end portion 11b. In this illustrated embodiment, the portions 11a, 11b and 11c are formed as a one-piece, unitary member by stamping a single metal plate into the desired form. The support plate 11 is configured and arranged such that a front most portion of the support plate 11 is located farther forward the front most portion of the cross members 5 and 6 and the vertical retainer 7.

The upper wall portion 11a and the lower end portion 11b are supported on the vehicle front end portion of the vehicle body B to form the unobstructed space or open energy absorbing area 12 that is oriented in the vehicle widthwise direction WD. In particular, the unobstructed space or open energy absorbing area 12 is located rearward of and aligned with the charging port mounting wall portion 11c as viewed in the vehicle lengthwise direction. In particular, in this illustrated embodiment, the support plate 11, the upper cross member 6 (vehicle body frame member), and the vertical retainer 7 (vehicle body frame member) together define the unobstructed space or open energy absorbing area 12, as shown in FIG. 2. The unobstructed space or open energy absorbing area 12 prevents the mounting rigidity (vehicle body support rigidity) of the support plate 11 from being too high while still allowing the minimum necessary mounting rigidity (vehicle body support rigidity) to be provided. In this illustrated embodiment, the unobstructed space or open energy absorbing area 12 extends the entire width of the support plate 11 as well as the entire height of the support plate 11.

The upper wall portion 11a and the lower end portion 11b constitutes an energy absorbing structure that is configured and arranged to deform into the unobstructed space or open energy absorbing area 12 and towards the vehicle front end portion during a frontal impact. In other words, the support plate 11 (the charging port support member) is supported on the vehicle front end portion of the vehicle body B with the energy absorbing structure (e.g., the upper wall portion 11a and the lower end portion 11b) that plastically deforms into the unobstructed space or open energy absorbing area 12 during a frontal impact. In this way, the vehicle charging port structure absorbs energy during a frontal collision by deforming plastically. In the illustrated embodiment, the support plate 11 has a lower plastic deformation threshold than the deformation threshold of the cross members 5 and 6 so that the support plate 11 deforms prior to the cross members 5 and 6 as a result of a rearward directed force being applied to the cross members 5 and 6 through the support plate 11. Also, the support plate 11 has a lower plastic deformation threshold than the deformation threshold of the vertical retainer 7 so that the support plate 11 deforms prior to the vertical retainer 7 as a result of a rearward directed force being applied to the vertical retainer 7 through the support plate 11. Thus, the support plate 11 can reliably absorb impact energy during a front collision or application of an abnormally large load by being crushable.

As shown in FIG. 1, the upper wall portion 11a of the support plate 11 has a cut-out 11d such that the upper wall portion 11a has a generally C-shaped that is oriented to open in a longitudinally rearward direction of the vehicle V. In other words, the upper wall portion 11a has a pair of rearward extending legs 11e and 11f defining cut-out 11d. The legs 11e and 11f are fastened to the upper cross member 6 (vehicle body frame member) with a pair of bolts 13. The lower end portion 11b of the support plate 11 is fastened to the vertical retainer 7 (vehicle body frame member) with a pair of bolts 14. Thus, the energy absorbing structure (e.g., the upper wall portion 11a and the lower end portion 11b) of the support plate 11 (the charging port support member) is attached to the vehicle front end portion at three attachment points that are spaced apart and located to form apexes of a triangle. In this illustrated embodiment, the charging port mounting wall portion 11c spanning between the horizontal upper wall portion 11a and the lower end portion 11b of the support plate 11 is arranged such that the charging port mounting wall portion 11c is slanted rearward and upward, i.e., such that an intersection angle θ (see FIG. 2) between the upper wall portion 11a and the charging port mounting wall portion 11c is an obtuse angle θ.

In this illustrated embodiment, in addition to the front end portion of the vehicle body B and the support plate 11, the vehicle charging port arrangement further includes at least one electric charging port 15. The electric charging port 15 is attached to the support plate 11 (the charging port support member), with the electric charging port 15 being configured to receive an electric charging connector (not shown). In particular, the charging port mounting wall portion 11c has a pair of charging port mounting openings 11g for mounting two charging ports 15 (only one shown in FIG. 2). The charging ports 15 are arranged horizontally adjacent to each other. The one of the charging port ports 15 is configured for low-speed charging (e.g., using a 100-V or 200-V power source), while the other one of the charging port ports 15 is configured for high-speed charging (e.g., using a 400-V power source) that can be completed in a short period of time relative to the low-speed charging.

In the charging port structure according to this embodiment, the charging ports 15 are mounted to the support plate 11, which is attached to the upper cross member 6 (vehicle body frame member) and the vertical retainer 7 (vehicle body frame member). An onboard battery (not shown) of the vehicle V is charged by inserting a charging plug or connector of an external electric power source (not shown) into one of the charging ports 15 and supplying electric power from the external electric power source. When the onboard battery has fully charged or reached a prescribed state of charge, charging is stopped automatically or manually and the charging plug is retracted from the charging port 15. In the charging port structure according to this embodiment, the charging ports 15 are attached to the upper cross member 6 (vehicle body frame member) and the vertical retainer 7 (vehicle body frame member) through the support plate 11 (support member) with the charging ports 15 being partially disposed within the unobstructed space or open energy absorbing area 12.

The unobstructed space or open energy absorbing area 12 prevents a mounting rigidity (vehicle body support rigidity) of the charging ports 15 from being too high while still allowing a minimum necessary mounting rigidity (vehicle body support rigidity) to be provided. The energy absorbing structure (e.g., the upper wall portion 11a and the lower end portion 11b) of the support plate 11 (the charging port support member) also deforms elastically from a misaligned insertion/removal force being imparted to the charging port mounting wall portion 11c during insertion and/or removal of a charging plug. In this way, the vehicle charging port structure absorbs a misaligned insertion/removal force imparted when a charging plug is inserted into or removed from one of the charging ports 15 by deforming elastically. In other words, since the vehicle charging port arrangement has the unobstructed space or open energy absorbing area 12, a misaligned insertion/removal force applied by the charging plug can be absorbed by elastic deformation of the support plate 11 and the misaligned insertion/removal force will not cause the service life of the charging port 15 to decline.

Figure 3:
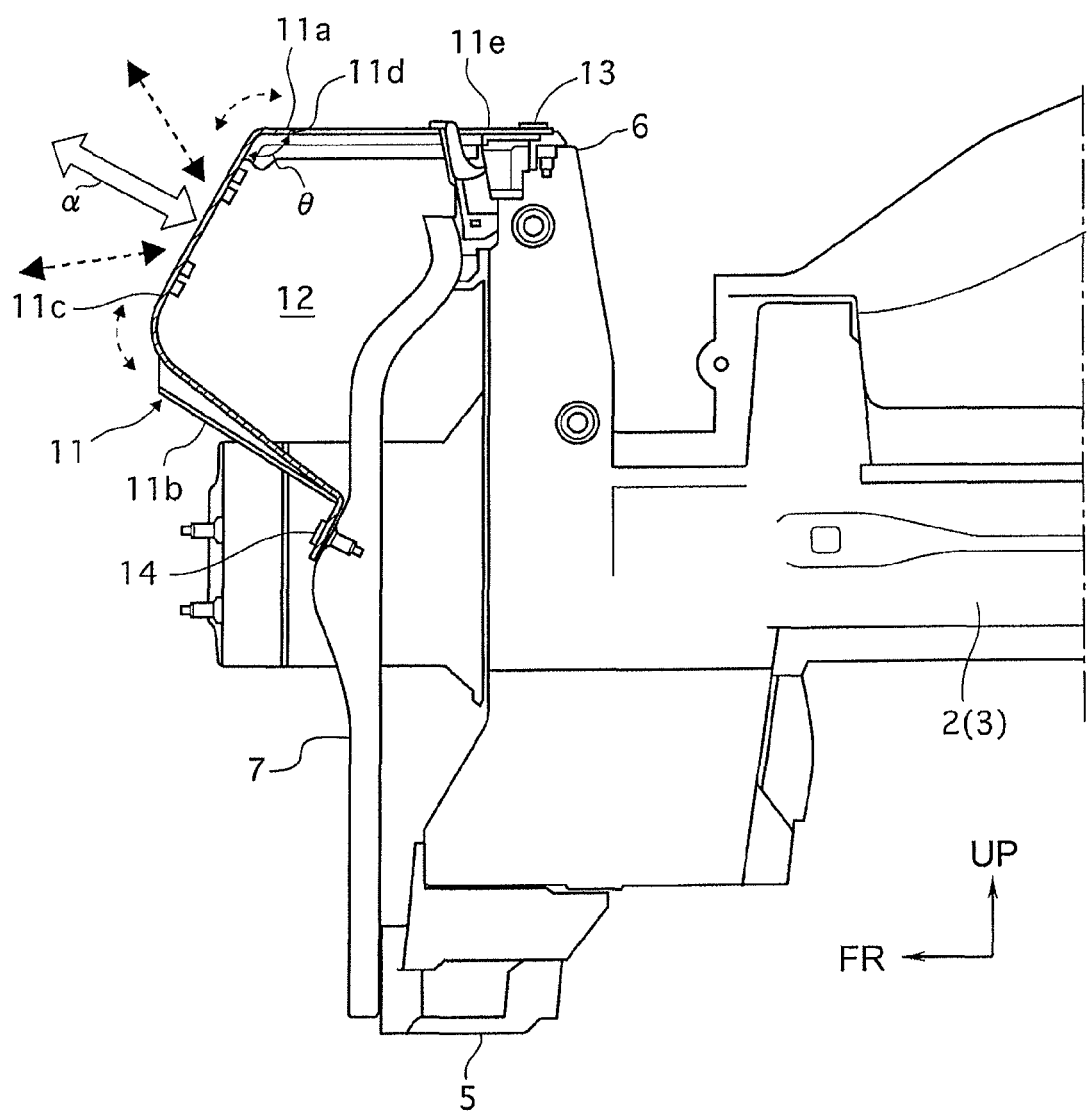
FIG. 3 is an enlarged, simplified left side elevational view, similar to FIG. 2, but with the charging port removed to explain the misaligned insertion/removal forces that occur during insertion and/or removal the charging plug from the charging port.

This embodiment also achieves other operational effects as a result of the support plate 11 (support member) being configured to have the unobstructed space or open energy absorbing area 12 oriented in the widthwise direction of the vehicle. If a charging plug is inserted into or removed from the charging port 15 (see FIG. 2) as seen by the solid arrow in FIG. 2, then the charging plug is inserted into or removed with a zero insertion/removal force. However, this situation will not always occur. When a charging plug is inserted into or removed from the charging port 15 (see FIG. 2), it is possible for the insertion/removal force of the charging plug to deviate from the straight direction indicated with an unfilled arrow in FIG. 3. In such a case, as seen in FIG. 3, a misaligned insertion/removal force acts against the charging plug in a direction indicated with a broken-line arrow in FIG. 3, the misaligned insertion/removal force can be absorbed through elastic deformation of the support plate 11. As a result, a vehicle body support rigidity of the charging port 15 is not too high and the misaligned insertion/removal force is not born entirely by the charging port 15 (see FIG. 2) and shortening of the service life of the charging port 15 can be avoided. Thus, the aforementioned second design consideration can be satisfied with the vehicle charging port arrangement of the illustrated embodiment.

Figure 4:
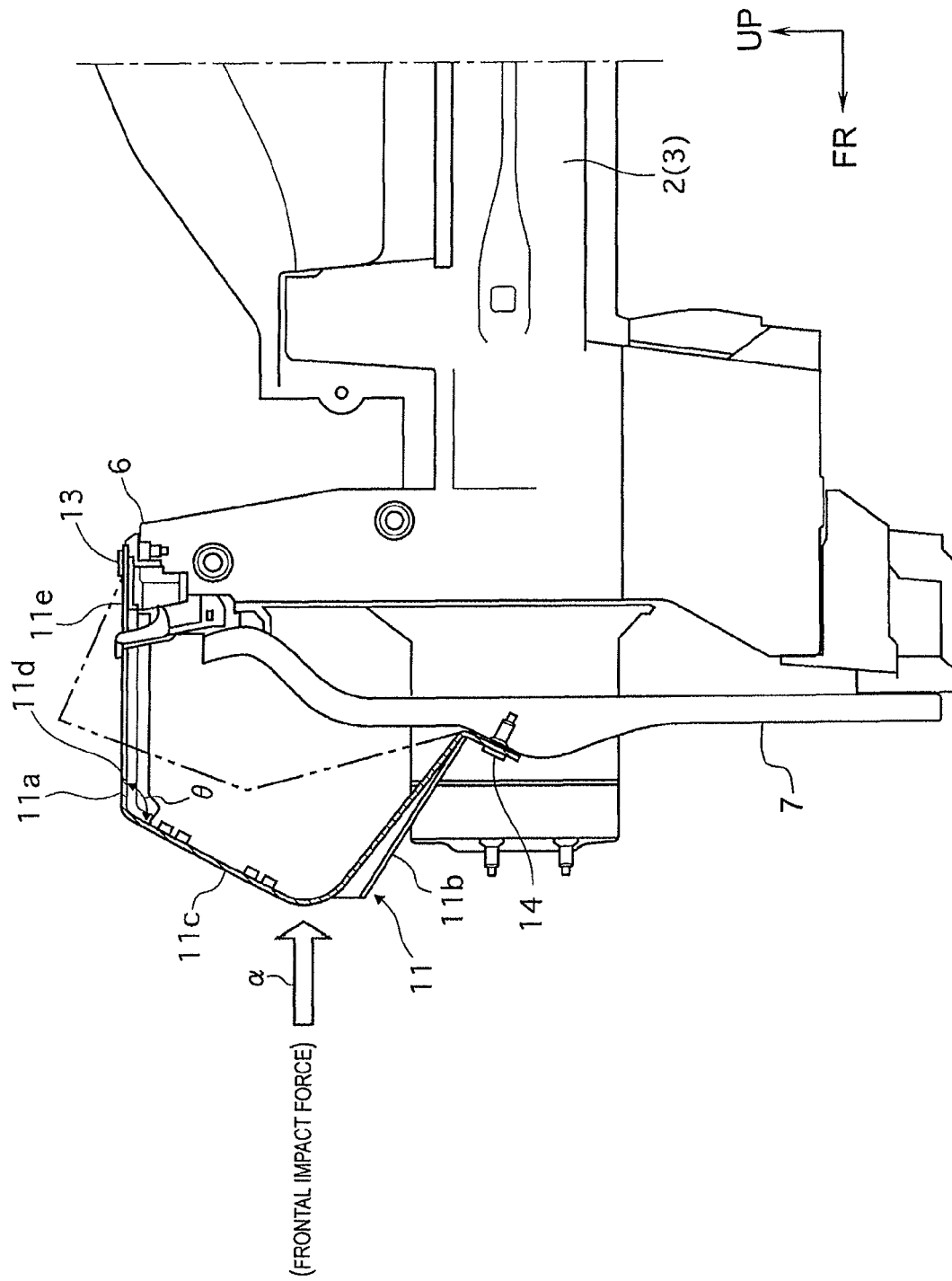
FIG. 4 is an enlarged, simplified left side elevational view, similar to FIG. 2, but with the charging port removed to explain how the charging port structure is crushed when a front collision force is applied to the charging port structure.

For a similar reason, as seen in FIG. 4, the support plate 11 can be crushed readily by a front impact load a during a frontal collision of the vehicle such that an impact energy absorbing function is accomplished. In this illustrated embodiment, the support plate 11 plastically deforms so that the support plate 11 moves upward and rearward in response to a frontal impact force as seen in FIG. 4. Thus, the vehicle charging port arrangement according to this embodiment can be arranged in a crushable region of the vehicle front end portion of the vehicle body B, i.e., a portion frontward of the strut towers 4. In other words, a degree of freedom with respect to the placement of the charging port structure can be increased and the aforementioned third design consideration can be satisfied. Consequently, with a charging port structure according to this embodiment, the charging port structure can even be installed near a front end of the vehicle front end portion of the vehicle body B such that a charging plug can be inserted into and removed from the charging port 15 easily from in front of the vehicle V.

As explained previously, the vehicle charging port arrangement according to this embodiment can be arranged in the front crushable region of the vehicle body B, which is located frontward of the strut towers 4. However, since the vehicle charging port arrangement provides a minimum required mounting rigidity (vehicle body support rigidity) for the charging ports 15, it is also acceptable for the charging port structure to be arranged in a non-crushable region of the vehicle front end portion of the vehicle body B located rearward of the strut towers 4.

The ability to satisfy the second and third design considerations as mentioned previously is even more pronounced when, as shown in FIGS. 1 to 4, the upper wall portion 11*a* of the support plate 11 is generally C-shaped due to the formation of a rectangular cut-out 11*d*, and the legs 11*e* and 11*f* are attached to the upper cross member 6 (vehicle body frame member) with the bolts 13, and the lower end portion 11*b* of the support plate 11 is attached to the vertical retainer 7 (vehicle body frame member) with the bolts 14.

Additionally, the ability to satisfy the second and third design considerations as mentioned previously is even more pronounced when, as shown in FIGS. 1 to 4, the charging port mounting wall portion 11*c* spanning between the upper wall portion 11*a* and the lower end portion 11*b* of the support plate 11 is arranged such that the charging port mounting wall portion 11*c* is slanted rearward and upward, i.e., such that the intersection angle θ between the upper wall portion 11*a* and the charging port mounting wall portion 11*c* is an obtuse angle. With the charging port mounting wall portion 11*c* slanted rearward and upward, an insertion hole of the charging port 15 can also be directed upward as shown in FIG. 2, which is convenient for inserting and removing a charging plug.

In the charging port structure shown in FIGS. 1 to 4, the support plate 11 has a generally U-shaped (open) cross section and when the support plate 11 is attached to the vehicle front end portion of the vehicle body B, the unobstructed space or open energy absorbing area 12 is defined by the support plate 11, the upper cross member 6 (vehicle body frame member), and the vertical retainer 7 (vehicle body frame member). As a result, the charging port structure is inexpensive, includes a minimal number of additional parts, involves a minimal increase in weight, and achieves the various other operational effects mentioned heretofore.

In the charging port support structure shown in FIGS. 1 to 4, the unobstructed space or open energy absorbing area 12 is defined by the support plate 11, the upper cross member 6 (vehicle body frame member), and the vertical retainer 7 (vehicle body frame member). However, the same operational effects as described previously can be obtained by configuring the support plate 11 to have a closed cross sectional shape (e.g., a generally circular or rectangular cross section) such that the support plate alone defines an unobstructed space or open energy absorbing area that is oriented in a widthwise direction of the vehicle, with the support plate being attached to vehicle body frame members in a similar region to that depicted in the FIGS. 1 to 4.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also as used herein to describe the above embodiment(s), the following directional terms "forward, rearward, above, downward, vertical, horizontal, below and transverse" as well as any other similar directional terms refer to those directions of a vehicle equipped with the vehicle charging port arrangement. Accordingly, these terms, as utilized to describe the present invention should be interpreted relative to a vehicle equipped with the vehicle charging port arrangement.

While only selected embodiments have been chosen to illustrate the present invention, it will be apparent to those skilled in the art from this disclosure that various changes and modifications can be made herein without departing from the scope of the invention as defined in the appended claims. Every feature which is unique from the prior art, alone or in combination with other features, also should be considered a separate description of further inventions, and including the structural and/or functional concepts embodied by such feature. Thus, the foregoing descriptions of the embodiments according to the present invention are provided for illustration only, and not for the purpose of limiting the invention as defined by the appended claims and their equivalents.

What is claimed is:

1. An impact energy absorbing vehicle charging port support arrangement comprising:

a vehicle body including a vehicle front end portion;

a charging port support member supported on the vehicle front end portion with the charging port support member including an energy absorbing structure that is configured and arranged to deform towards a support structure of the vehicle front end portion and into an energy absorbing area that is disposed forward of the support structure of the vehicle front end portion during a frontal impact such that the charging port support member moves upward and rearward during the frontal impact; and an electric charging port attached to the charging port support member, with the electric charging port being configured to receive an electric charging connector;

the charging port support member including a charging port mounting wall slanting upward and rearward in the vehicle lengthwise direction, and a charging port mounting opening provided in the charging port support member receiving the electric charging port support member, the charging port mounting opening being directed in an upward direction.

2. The impact energy absorbing vehicle charging port support arrangement as recited in claim 1, wherein the energy absorbing structure and the vehicle front end portion are arranged to form unobstructed space as the energy absorbing area, with the unobstructed space being oriented in a vehicle widthwise direction that is located rearward of and aligned with the charging port support member as viewed in a vehicle lengthwise direction.

3. The impact energy absorbing vehicle charging port support arrangement as recited in claim 1, wherein the energy absorbing structure is attached to the vehicle front end portion at three attachment points that are spaced apart and located to form apexes of a triangle.

4. The impact energy absorbing vehicle charging port support arrangement as recited in claim 1, wherein the support structure of the vehicle front end portion includes at least one vehicle body frame member to which the energy absorbing structure is attached.

5. The impact energy absorbing vehicle charging port support arrangement as recited in claim 1, wherein the energy absorbing structure includes an upper wall portion having a pair of rearward extending legs defining a cut-out that opens in a vehicle longitudinally rearward direction, with free ends of the legs being attached to the support structure of the vehicle front end portion.

6. The impact energy absorbing vehicle charging port support arrangement as recited in claim 5, wherein the energy absorbing structure further includes a lower end portion that is attached to the support structure of the vehicle front end portion.

7. The impact energy absorbing vehicle charging port support arrangement as recited in claim 6, wherein
the charging port mounting wall spans between the upper wall portion and the lower end portion.

8. The impact energy absorbing vehicle charging port support arrangement as recited in claim 1, wherein
the charging port support member is attached to the support structure of the vehicle front end portion at a location forward of a front collision crushable structure of the vehicle front end portion of the vehicle body that deforms rearward in the vehicle lengthwise direction to absorb energy and during a frontal impact.

9. The impact energy absorbing vehicle charging port support arrangement as recited in claim 8, wherein
the charging port support member is attached to the support structure near a front end of the front collision crushable structure of the vehicle front end portion of the vehicle body.

10. The impact energy absorbing vehicle charging port support arrangement as recited in claim 1, wherein
the charging port support member and the energy absorbing structure are integrally formed as a one-piece support plate that is attached to the vehicle front end portion.

11. The impact energy absorbing vehicle charging port support arrangement as recited in claim 2, wherein
the energy absorbing structure is attached to the vehicle front end portion at three attachment points that are spaced apart and located to form apexes of a triangle.

12. The impact energy absorbing vehicle charging port support arrangement as recited in claim 2, wherein
the support structure of the vehicle front end portion includes at least one vehicle body frame member to which the energy absorbing structure is attached.

13. The impact energy absorbing vehicle charging port support arrangement as recited in claim 2, wherein
the energy absorbing structure includes an upper wall portion having a pair of rearward extending legs defining a cut-out that opens in a vehicle longitudinally rearward direction, with free ends of the legs being attached to the support structure of the vehicle front end portion.

14. The impact energy absorbing vehicle charging port support arrangement as recited in claim 13, wherein
the energy absorbing structure further includes a lower end portion that is attached to the support structure of the vehicle front end portion.

15. The impact energy absorbing vehicle charging port support arrangement as recited in claim 14, wherein
the charging port support member includes a charging port mounting wall that spans between the upper wall portion and the lower end portion, with the charging port mounting wall slanting upward and rearward in the vehicle lengthwise direction.

16. The impact energy absorbing vehicle charging port support arrangement as recited in claim 2, wherein
the charging port support member is attached to the support structure of the vehicle front end portion at a location forward of a front collision crushable structure of the vehicle front end portion of the vehicle body that deforms rearward in the vehicle lengthwise direction to absorb energy and during a frontal impact.

17. The impact energy absorbing vehicle charging port support arrangement as recited in claim 16, wherein
the charging port support member is attached to the support structure near a front end of the front collision crushable structure of the vehicle front end portion of the vehicle body.

18. The impact energy absorbing vehicle charging port support arrangement as recited in claim 2, wherein
the charging port support member and the energy absorbing structure are integrally formed as a one-piece support plate that is attached to the vehicle front end portion.

19. The impact energy absorbing vehicle charging port support arrangement as recited in claim 11, wherein
the support structure of the vehicle front end portion includes at least one vehicle body frame member to which the energy absorbing structure is attached.

20. The impact energy absorbing vehicle charging port support arrangement as recited in claim 11, wherein
the energy absorbing structure includes an upper wall portion having a pair of rearward extending legs defining a cut-out that opens in a vehicle longitudinally rearward direction, with free ends of the legs being attached to the support structure of the vehicle front end portion.

21. An impact energy absorbing vehicle charging port support arrangement comprising:
a vehicle body including a vehicle front end portion;
a charging port support member supported on the vehicle front end portion with the charging port support member including an energy absorbing structure that is configured and arranged to deform towards a support structure of the vehicle front end portion and into an energy absorbing area that is disposed forward of the support structure of the vehicle front end portion during a frontal impact; and
an electric charging port attached to the charging port support member, with the electric charging port being configured to receive an electric charging connector,
the energy absorbing structure including an upper wall portion and a lower end portion, the upper wall portion having a pair of rearward extending legs defining a cut-out that opens in a vehicle longitudinally rearward direction, with free ends of the legs being attached to the support structure of the vehicle front end portion, and the lower end portion being attached to the support structure of the vehicle front end portion, and
the charging port support member including a charging port mounting wall that spans between the upper wall portion and the lower end portion, with the charging port mounting wall slanting upward and rearward in the vehicle lengthwise direction.

22. An impact energy absorbing vehicle charging port support arrangement comprising:
a vehicle body including a vehicle front end portion;
a charging port support member supported on the vehicle front end portion with the charging port support member including an energy absorbing structure that is configured and arranged to deform towards a support structure of the vehicle front end portion and into an energy absorbing area that is disposed forward of the support structure of the vehicle front end portion during a frontal impact; and
an electric charging port attached to the charging port support member, with the electric charging port being configured to receive an electric charging connector,
the energy absorbing structure and the vehicle front end portion being arranged to form an unobstructed space as the energy absorbing area, with the unobstructed space being oriented in a vehicle widthwise direction that is located rearward of and aligned with the charging port support member as viewed in a vehicle lengthwise direction, the energy absorbing structure including an upper wall portion and a lower end portion, the upper wall portion having a pair of rearward extending legs defining a cut-out that opens in a vehicle longitudinally rearward direction, with free ends of the legs being attached to the support structure of the vehicle front end portion, and the lower end portion being attached to the support structure of the vehicle front end portion, and the charging port support member including a charging port mounting wall that spans between the upper wall portion and the lower end portion, with the charging port mounting wall slanting upward and rearward in the vehicle lengthwise direction.

\* \* \* \* \*